(12) United States Patent
Sadasivan et al.

(10) Patent No.: US 12,214,962 B2
(45) Date of Patent: Feb. 4, 2025

(54) INTEGRATED MOTORIZED CONVEYOR ROLLERS

(71) Applicant: INTELLIGRATED HEADQUARTERS, LLC, Mason, OH (US)

(72) Inventors: Saravanan Sadasivan, Bangalore (IN); Jeyaprakash Kandasamy, Tamil Nadu (IN); Rajesh Kaliyaperumal, Tamil Nadu (IN); Ravi Kumar Avupati, Hyderabad (IN)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 18/404,730

(22) Filed: Jan. 4, 2024

(65) Prior Publication Data

US 2024/0294339 A1    Sep. 5, 2024

Related U.S. Application Data

(63) Continuation of application No. 17/454,852, filed on Nov. 15, 2021, now Pat. No. 11,897,697.

(30) Foreign Application Priority Data

Oct. 1, 2021  (IN) .............................. 202111044566

(51) Int. Cl.
  *B65G 13/04* (2006.01)
  *B65G 23/08* (2006.01)
  *B65G 43/10* (2006.01)

(52) U.S. Cl.
  CPC ............. *B65G 13/04* (2013.01); *B65G 23/08* (2013.01); *B65G 43/10* (2013.01); *B65G 2203/0258* (2013.01)

(58) Field of Classification Search
  CPC ........ B65G 13/04; B65G 23/08; B65G 43/10; B65G 2203/0258
  See application file for complete search history.

(56) References Cited

U.S. PATENT DOCUMENTS

| | | |
|---|---|---|
| 6,370,447 B1 | 4/2002 | Miyazaki |
| 6,701,214 B1 | 3/2004 | Wielebski et al. |
| | (Continued) | |

FOREIGN PATENT DOCUMENTS

| | | |
|---|---|---|
| CN | 108773622 A | 11/2018 |
| DE | 102018133482 A1 | 6/2020 |

OTHER PUBLICATIONS

European search report Mailed on Feb. 7, 2023 for EP Application No. 22193526.

(Continued)

*Primary Examiner* — Gene O Crawford
*Assistant Examiner* — Lester III Rushin
(74) *Attorney, Agent, or Firm* — Alston & Bird LLP

(57) ABSTRACT

Apparatuses, methods and systems comprising integrated motorized conveyor rollers are provided. The example integrated motorized conveyor roller comprises: a housing; a motor assembly and a drive assembly at least partially disposed within the housing that are configured to cause rotation of at least a portion of the integrated motorized conveyor roller; at least one sensing element operatively coupled to the integrated motorized conveyor roller; and a controller component in electronic communication with the at least one sensing element, the motor assembly and the drive assembly, wherein the controller component is configured to obtain operational data via the at least one sensing element.

20 Claims, 11 Drawing Sheets

(56) References Cited

U.S. PATENT DOCUMENTS

| | | | |
|---|---|---|---|
| 6,820,736 B2 | 11/2004 | Itoh et al. | |
| 7,360,638 B2 | 4/2008 | Ko et al. | |
| 8,364,307 B2 | 1/2013 | Carlson et al. | |
| 2004/0096362 A1* | 5/2004 | Barry | B65G 23/08 |
| | | | 422/65 |
| 2012/0024669 A1 | 2/2012 | Danelski et al. | |
| 2012/0290126 A1 | 11/2012 | Combs et al. | |
| 2012/0312663 A1* | 12/2012 | Schmidt | H04Q 9/00 |
| | | | 198/788 |
| 2016/0075518 A1 | 3/2016 | Itoh et al. | |
| 2017/0313522 A1* | 11/2017 | Ramezani | B65G 21/14 |
| 2022/0274783 A1 | 9/2022 | Biro et al. | |

OTHER PUBLICATIONS

Examiner Interview Summary Record (PTOL-413) Mailed on Oct. 4, 2023 for U.S. Appl. No. 17/454,852, 1 page(s).
Final Rejection Mailed on Jul. 26, 2023 for U.S. Appl. No. 17/454,852, 15 page(s).
Non-Final Rejection Mailed on Apr. 12, 2023 for U.S. Appl. No. 17/454,852, 13 page(s).
Notice of Allowance and Fees Due (PTOL-85) Mailed on Oct. 4, 2023 for U.S. Appl. No. 17/454,852, 7 page(s).

* cited by examiner

INTEGRATED MOTORIZED CONVEYOR ROLLERS

CROSS-REFERENCE TO RELATED APPLICATIONS

This application is a continuation of U.S. patent application Ser. No. 17/454,852, filed Nov. 15, 2021, which claims priority to Indian Application No. 202111044566, filed Oct. 1, 2021, the contents of each are hereby incorporated herein in its entirety by reference.

BACKGROUND

The present disclosure relates in general to an integrated motorized conveyor roller for a conveyor system. Many rotating apparatuses and devices for conveyor systems are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems comprising integrated motorized conveyor rollers.

In accordance with various examples of the present disclosure, an integrated motorized conveyor roller is provided. The integrated motorized conveyor roller may comprise: a housing, a motor assembly and a drive assembly at least partially disposed within the housing that are configured to cause rotation of at least a portion of the integrated motorized conveyor roller, at least one sensing element, and an controller component in electronic communication with the at least one sensing element, the motor assembly and the drive assembly, wherein the controller component is configured to obtain operational data via the at least one sensing element.

In accordance with various examples of the present disclosure, a method is provided. The method may comprise receiving, by a controller component of an integrated motorized conveyor roller, configuration data from a computing entity in electronic communication with the integrated controller component, and causing, by the controller component and based at least in part on the configuration data, rotation of at least a portion of the integrated motorized conveyor roller via a motor assembly and a drive assembly at least partially disposed within a housing of the integrated motorized conveyor roller.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
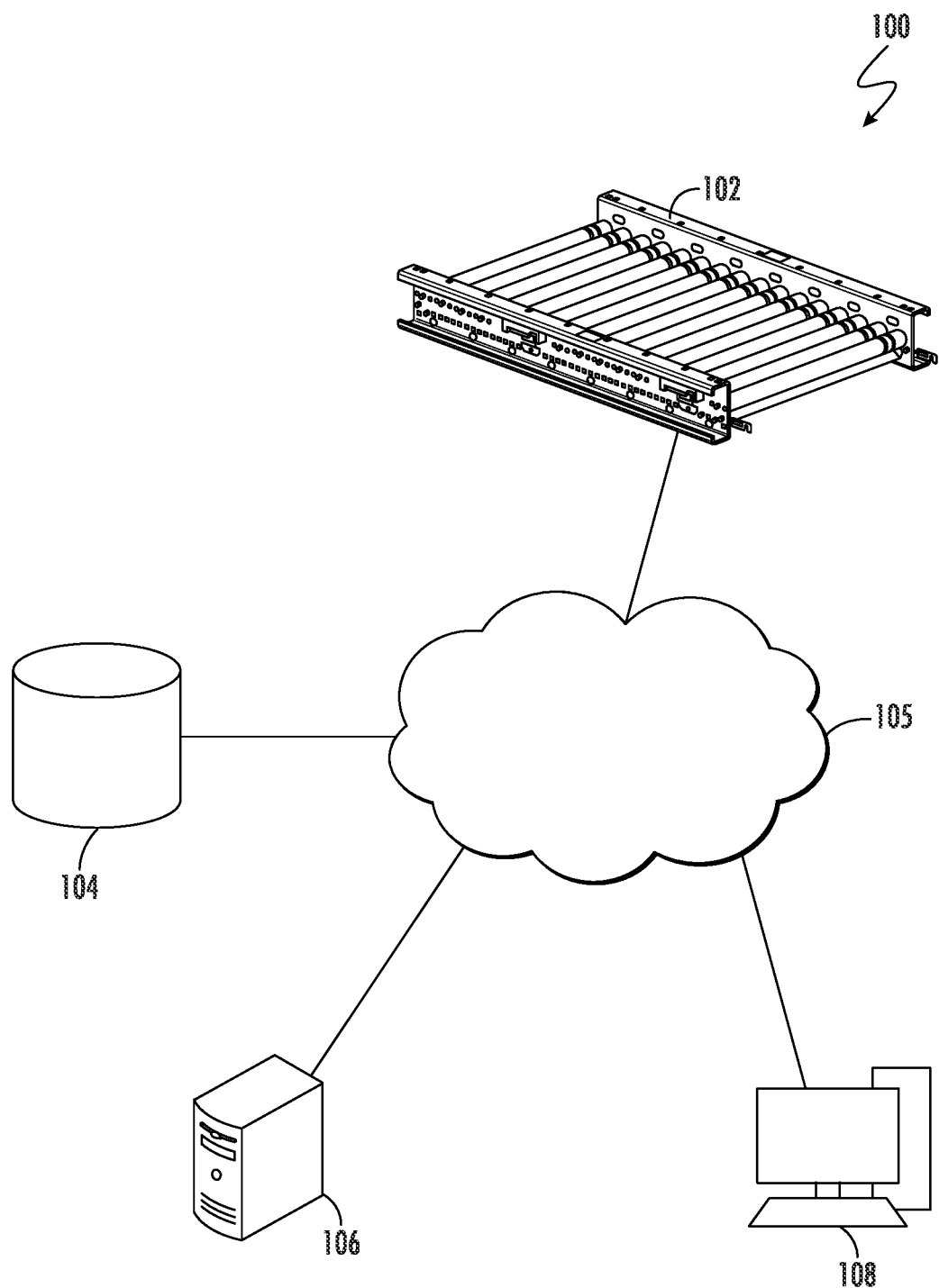
FIG. 1 illustrates an example of a system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure may refer to two or more electrical elements (for example, but not limited to, an example processing circuitry, communication element, input/output module memory) and/or electric circuit(s) being connected through wired means (for example but not limited to, conductive wires, system bus, wired Ethernet connection or traces) and/or wireless means (for example but not limited to, wireless network, electromagnetic field, Wi-Fi, Bluetooth, Zigbee), such that data and/or information (for example, electronic indications, signals) may be transmitted to and/or received from the electrical elements and/or electric circuit(s) that are electronically coupled.

The terms "conveyor," "conveyor section," "conveyor bed," "conveyor assembly" or "conveyor system," and similar terms are used interchangeably herein to refer to an apparatus that is configured to convey objects or articles within a material handling system in accordance with embodiments of the present disclosure. A motorized conveyor roller according to some embodiments discussed herein may comprise a plurality of drive components including a motor assembly and a drive assembly which operate to drive a housing (e.g., roller tube). These assemblies may have one or more components that are arranged in various configurations within an inner portion of the motorized conveyor roller. In some embodiments, the drive assembly may be fixed relative to the housing (e.g., roller tube), while the motor assembly is fixed relative to a frame supporting the roller tube, such that the motor assembly may be configured to rotate the drive assembly and roller tube.

In some embodiments, motorized rollers for conveyors may utilize external control cards to facilitate various operations (e.g., to set control motor speed and direction). In some examples, these control cards are mounted directly to the conveyors (e.g., conveyor side rails) requiring additional space and complex wiring in order to interface with other devices or modules (e.g., sensors, power, input/output communications, or the like). For example, a motorized roller may be controlled by one or more motor controllers which communicate with a programmable controller. The programmable controller (PC) may be an industrial PC which communicates with the one or more motor controllers connected via a communication bus, for example, via a RS232 bus in order to set speed limit, set current limit, or set various modes of operation for the motorized rollers.

Additionally, many motorized rollers are not capable of detecting objects and rely on information obtained using separate imaging devices distributed within the environment. These imaging devices may also require additional hard wiring and complex configuration to interface properly with the motorized rollers.

In some examples, a motorized roller may be hard wired to one or more other motorized rollers (e.g., in a daisy chain fashion) in order to facilitate communication therebetween. Accordingly, an example motorized roller may comprise an extensive wired network (e.g., up to 34 individual wires to a given motorized roller) leading to and exacerbating installation and servicing complexities.

Moreover, in many examples, motorized rollers do not have any diagnostic or self check capabilities and rely on physical inspections and troubleshooting to identify offline or non-functional motorized rollers within a system. For example, such motorized rollers are not capable of generating an indication or alert relating to operating conditions (e.g., motor failure or suboptimal performance). In order to identify damaged or motorized rollers or motorized rollers in a faulted state, a person may have to visually inspect the system for non-functional components and halt operations until certain motorized rollers can be repaired or replaced. This may lead to reduced throughput and operational inefficiencies.

In accordance with various embodiments of the present disclosure, example methods, apparatuses, computer program products and systems are provided.

For example, the present disclosure may provide an integrated motorized conveyor roller comprising a housing, a motor assembly and a drive assembly at least partially disposed within the housing that are configured to cause rotation of at least a portion of the integrated motorized conveyor roller, at least one sensing element, and an integrated controller component in electronic communication with the at least one sensing element, the motor assembly and the drive assembly, wherein the controller component is configured to obtain operational data via the at least one sensing element. In some examples, the controller component is further configured to receive configuration data from a computing entity in electronic communication with the controller component, and perform operations based at least in part on the configuration data. In some examples, the controller component is further configured to transmit at least a portion of the operational data to a computing entity in electronic communication with the controller component. In some examples, the at least one sensing element comprises a load sensor that is configured to detect a presence or weight of an object disposed adjacent the integrated motorized conveyor roller. In some examples, the controller component is further configured to provide information regarding the presence or location of the object to at least one of another integrated motorized conveyer roller controller component or another computing entity in electronic communication therewith. In some examples, the at least one sensing element comprises one or more light detection and ranging (LiDAR) sensors, radio detection and ranging (RADAR) sensors, infrared (IR) cameras, 3D cameras, 360° Cameras or photoelectric sensors. In some examples, the at least one sensing element is configured to detect one or more parameters associated with the motor assembly. In some examples, the one or more parameters comprise at least one of a lifetime motor operational time, a number of rotations, loading conditions or vibrational information. In some examples, the controller component comprises at least one printed circuit board (PCB) stack. In some examples, the at least one PCB stack is integrated into an end cap of the integrated motorized conveyor roller. In some examples, the controller component is in electronic communication with one or more other motorized conveyor roller controller components such that they can exchange data with one another. In some examples, the controller component is in electronic communication with the one or more other motorized conveyor roller controller components or computing entities via a Bluetooth, Bluetooth Low Energy (BLE) or Long Range (LoRa) connection.

In another example, a method is provided. The method may comprise receiving, by a controller component of an integrated motorized conveyor roller, configuration data from a computing entity in electronic communication with the controller component, and causing, by the controller component and based at least in part on the configuration data, rotation of at least a portion of the integrated motorized conveyor roller via a motor assembly and a drive assembly at least partially disposed within a housing of the integrated motorized conveyor roller. In some examples, the method may comprise obtaining, by the controller component, operational data via at least one sensing element of the integrated motorized conveyor roller. In some examples, the method may comprise transmitting, by the controller component, at least a portion of the operational data to a computing entity in electronic communication with the controller component. In some examples, the at least one sensing element comprises a load sensor that is configured to detect a presence or weight of an object disposed adjacent the integrated motorized conveyor roller. In some examples, the method may comprise providing, by the controller component, information regarding the presence or location of the object to at least one of another integrated motorized conveyer roller controller component or another computing entity in electronic communication therewith. In some examples, the at least one sensing element comprises one or more LiDAR sensors, RADAR sensors, IR cameras, 3D cameras, 360° Cameras or photoelectric sensors. In some examples, the at least one sensing element is configured to detect one or more parameters associated with the motor assembly. In some examples, the one or more parameters comprise at least one of a lifetime motor operational time, a number of rotations, loading conditions or vibrational information.

As such, the present disclosure provides a integrated motorized conveyor roller that can be remotely configured with ease. Additionally, the integrated motorized conveyor roller is configured to obtain operational data (e.g., sensor data) relating to its functioning (e.g., for prognostic and/or diagnostic purposes) and/or objects in its environment. Moreover, the integrated motorized conveyor roller comprises a simplified networking interface requiring a reduced number of wires (e.g., 2 wires to provide power) thereby simplifying installation and maintenance of conveyor systems that include integrated motorized conveyor rollers.

Referring now to FIG. 1, a schematic diagram depicting an example system 100 in accordance various embodiments of the present disclosure is provided. As depicted, the example system 100 comprises a conveyor 102 comprising one or more motorized conveyor rollers, one or more computing entities 106 (e.g., servers), one or more databases 104, one or more networks 105, one or more user computing entities 108, and/or the like. In various examples, the system 100 may operate to convey objects within a particular location or environment.

In various embodiments, the conveyor 102 may be configured to transport objects within a particular location or environment utilizing one or more motorized conveyor rollers. In some embodiments, the conveyor 102 comprising one or more motorized conveyor rollers, the one or more computing entities 106, the one or more databases 104 and/or the one or more user computing entities 108 are in electronic communication with each other over the one or more networks 105 such that they can exchange data (e.g., receive and transmit data) with one another (e.g., periodically and/or in response to requests). Each of the components of the system 100, including the conveyor 102 comprising the one or more motorized conveyor rollers, the one or more computing entities 106, the one or more databases 104 and/or the one or more user computing entities 108 may be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, standalone devices, the various embodiments are not limited to this particular architecture.

As depicted in FIG. 1, the example system 100 comprises one or more computing entities 106. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FORAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the computing entity 106 with the assistance of the processing element and the operating system.

As indicated, in one embodiment, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 106 may be configured to communicate via wireless external communication networks using any of a variety of protocols, such as embedded sim (cSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 106 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 106 components may be located remotely from other computing entity 106 components, such as in a distributed system. Furthermore, one or more of the components may be aggregated and additional components performing functions described herein may be included in the computing entity 106. Thus, the computing entity 106 can be adapted to accommodate a variety of needs and circumstances, such as including various components described with regard to a mobile application executing on the user computing entity 108, including various input/output interfaces.

As depicted in FIG. 1, the system 100 comprises a user computing entity 108. In various embodiments, the user computing entity 108 may be or comprise one or more mobile devices, wearable computing devices, and/or the like. An example user computing entity 108 may include an antenna, a transmitter (e.g., radio), a receiver (e.g., radio), and a processing element that provides signals to and receives signals from the transmitter and receiver, respectively. The signals provided to and received from the transmitter and the receiver, respectively, may include signaling information/data in accordance with an air interface standard of applicable wireless systems to communicate with various devices, such as a computing entity (e.g., central server), another user computing entity 108, and/or the like. In an example embodiment, the transmitter and/or receiver are configured to communicate via one or more SRC protocols. For example, the transmitter and/or receiver may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 108 may also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 108 may be capable of operating with one or more air interface standards, communication protocols, modulation types, and access types. More particularly, the user computing entity 108 may operate in accordance with any of a number of wireless communication standards and protocols. In a particular embodiment, the user computing entity 108 may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 108 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 108 can also download changes, add-ons, and updates, for instance, to its firmware, software (e.g., including executable instructions, applications, program modules), and operating system.

According to one embodiment, the user computing entity 108 may include location determining aspects, devices, modules, functionalities, and/or similar words used herein interchangeably to acquire location information/data regularly, continuously, or in response to certain triggers.

The user computing entity 108 may also comprise a user interface device comprising one or more user input/output interfaces (e.g., a display and/or speaker/speaker driver coupled to a processing element and a touch interface, keyboard, mouse, and/or microphone coupled to a processing element). For example, the user interface may be configured to provide a mobile application, browser, interactive user interface, dashboard, webpage, and/or similar words used herein interchangeably executing on and/or accessible via the user computing entity 108 to cause display or audible presentation of information/data and for user interaction therewith via one or more user input interfaces. Moreover, the user interface can comprise or be in communication with any of a number of devices allowing the user computing entity 108 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 108 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 108 can capture, collect, store information/data, user interaction/input, and/or the like.

The user computing entity 108 can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FORAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 108.

As depicted in FIG. 1, any two or more of the illustrative components of the system 100 of FIG. 1 may be configured to communicate with one another via one or more networks 105. The networks 105 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 may have any suitable communication range associated therewith and may include, for example, global networks (e.g., the Internet), MANS, WANs, LANs, or PANs. In addition, the networks 105 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 100, it is noted that the scope of the present disclosure is not limited to the example shown in FIG. 1. In some examples, the system 100 may comprise one or more additional and/or alternative elements, and/or may be different from that illustrated in FIG. 1.

Figure 2:
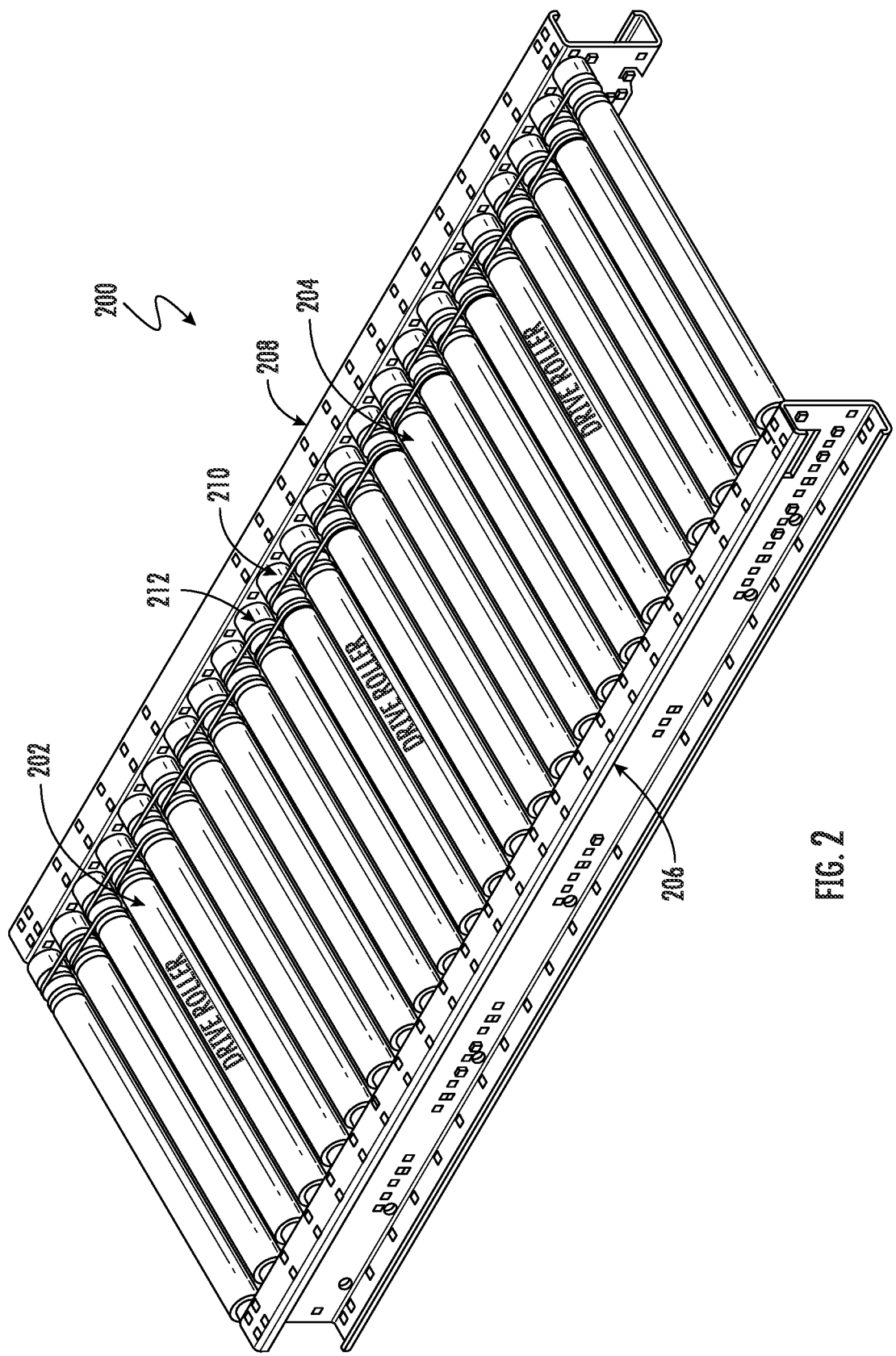
FIG. 2 illustrates an example conveyor bed with motorized and non-motorized rollers, in accordance with various embodiments of the present disclosure.

Referring now to FIG. 2, a schematic diagram depicting an example portion of a conveyor 200 with motorized and non-motorized conveyor rollers in accordance with various embodiments of the present disclosure is provided. In some embodiments, the example portion of a conveyor 200 may define a particular section or zone of a conveyor system.

As depicted in FIG. 2, the example conveyor 200 may comprise one or more motorized conveyor rollers, e.g., motorized conveyor roller 202, and one or more non-motorized conveyor rollers, e.g., non-motorized conveyor roller 204. In the embodiment depicted in FIG. 2, the example conveyor 200 further comprises at least a first rail 206 and a second rail 208. As depicted in FIG. 2, the plurality of motorized conveyor rollers and non-motorized conveyor rollers (e.g., motorized conveyor roller 202 and non-motorized conveyor roller 204) are mechanically/operatively coupled to the first rail 206 and the second rail 208. In some embodiments, the first rail 206 and the second rail 208 may include one or more sets of apertures configured to receive the plurality of motorized conveyor rollers and non-motorized conveyor rollers (e.g., motorized conveyor roller 202 and non-motorized conveyor roller 204).

In some embodiments, as depicted in FIG. 2, the non-motorized conveyor rollers (e.g., non-motorized conveyor roller 204) may be or comprise idler rollers or driven rollers. Additionally, the motorized conveyor rollers (e.g., motorized conveyor roller 202) may be or comprise drive rollers. In various embodiments, the motorized conveyor rollers/drive rollers are configured to drive the non-motorized conveyor rollers/idler rollers. For example, the motorized conveyor rollers/drive rollers may include drive bands, e.g., drive band 210. The example drive bands may comprise O-drive bands to drive the non-motorized conveyor rollers/idler rollers. As depicted in FIG. 2, in some examples, the motorized conveyor rollers/drive rollers and the non-motorized conveyor roller/idler rollers are connected to each other through a series of drive bands, e.g, drive band 210, in order to drive the non-motorized conveyor rollers/idler rollers. As further depicted, each of the drive bands, e.g., drive band 210, is reeved around a tracking ring, e.g., tracking ring 212, provided on the motorized conveyor rollers/drive rollers and the non-motorized conveyor rollers/idler rollers. The example tracking ring 212 may operate to ensure that the drive band 210 does not slip out of the drive rollers and the idler rollers when operating at full speed. The example drive band 210 may be connected to idler pulleys provided on/attached to either the first rail 206 or the second rail 208 of the conveyor 200 to maintain a target tension between the example drive band 210 and the motorized conveyor rollers/drive rollers and the non-motorized conveyor rollers/idler rollers (e.g., motorized conveyor roller 202 and non-motorized conveyor roller 204).

While FIG. 2 depicts an example conveyor 200, it is noted that the scope of the present disclosure is not limited to the example shown in FIG. 2. An example conveyor 200 in accordance with the present disclosure may comprise one or more additional and/or alternative elements, and/or may be different from that illustrated in FIG. 2.

Figure 3:
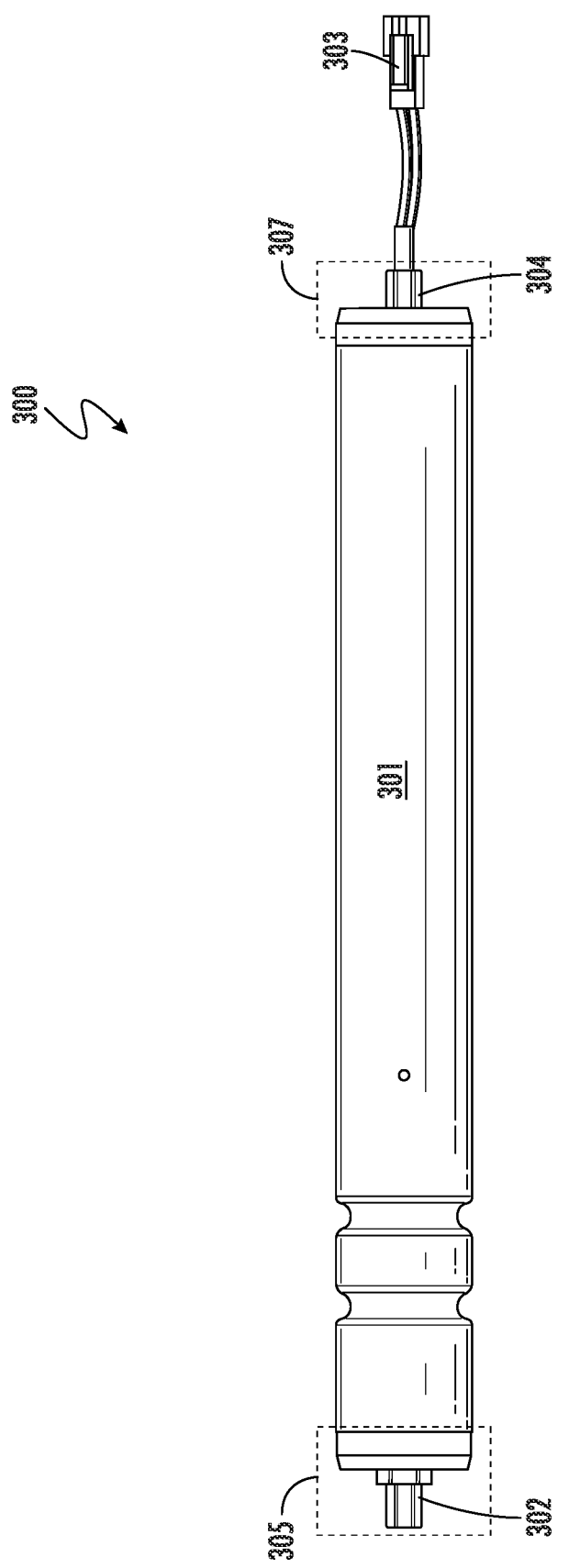
FIG. 3 illustrates an example integrated motorized conveyor roller in accordance with various embodiments of the present disclosure.

Referring now to FIG. 3, a schematic diagram depicting a perspective view of an example integrated motorized conveyor roller 300 in accordance with various embodiments of the present disclosure is provided. In various embodiments, the example integrated motorized conveyor roller 300 may be part of a conveyor/conveyor system (e.g., the conveyor 200 described above in connection with FIG. 2) and may be configured to drive one or more non-motorized conveyor rollers that are operatively coupled thereto. The conveyor/conveyor system may be part of an automated or semi-automated warehousing system in which objects may be stored, retrieved, conveyed, and/or the like in response to system instructions and/or user interactions via a computing entity (such as the user computing entity 108 described above in connection with FIG. 1). For example, the example integrated motorized conveyor roller 300 may be configured to convey objects along at least a portion of a conveyor based at least in part on system instructions.

As depicted in FIG. 3, the example integrated motorized conveyor roller 300 comprises a housing 301 (e.g., roller tube) configured to contain one or more components/elements of the integrated motorized conveyor roller 300 (e.g., a controller component, as discussed in further detail below). In some examples, the housing 301 (e.g., roller tube) of the integrated motorized conveyor roller 300 comprises a hollow cylindrical body and may comprise metal, plastic, combinations thereof, and/or the like.

As further illustrated in FIG. 3, the example integrated motorized conveyor roller 300 comprises a first end cap 305 defining a first end/surface of the example integrated motorized conveyor roller 300. As depicted, the first end cap 305 comprises a first appendage 302 configured to be operatively coupled to a conveyor (e.g., disposed between a first rail and a second rail, such as within an aperture of the first rail).

Additionally, as depicted, the example integrated motorized conveyor roller 300 comprises a second end cap 307 defining a second end/surface of the example integrated motorized conveyor roller 300. As depicted, the second end cap 307 comprises a second appendage 304 configured to be operatively coupled to a conveyor (e.g., disposed between a first rail and a second rail, such as within an aperture of the second rail). As further depicted in FIG. 3, the integrated motorized conveyor roller 300 comprises a power cable 303 disposed adjacent the second end cap 307 that is configured to be connected to a power supply. Additionally and/or alternatively, the power cable 303 may also be configured to provide a connection for data transfer.

Figure 4:
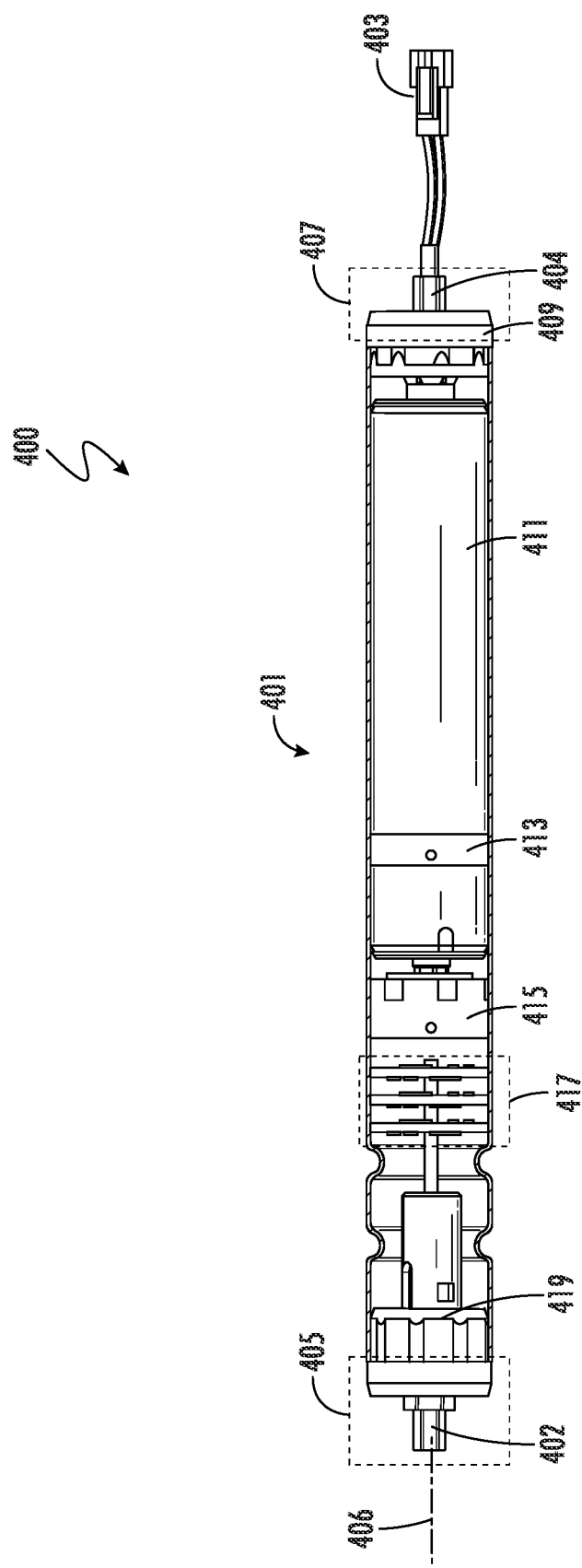
FIG. 4 illustrates a side section view of an example integrated motorized conveyor roller in accordance with various embodiments of the present disclosure.

Referring now to FIG. 4, a schematic diagram depicting a side section view of an example integrated motorized conveyor roller 400 in accordance with various embodiments of the present disclosure is provided. The example integrated motorized conveyor roller 400 may be similar or identical to the integrated motorized conveyor roller 300 discussed above in connection with FIG. 3. The example integrated motorized conveyor roller 400 may be part of a conveyor/conveyor system and may be configured to drive one or more non-motorized conveyor rollers that are operatively coupled thereto. The example integrated motorized conveyor roller 400 may be configured to convey objects along at least a portion of a conveyor based at least in part on system instructions and/or user interactions via a computing entity (such as the user computing entity 108 described above in connection with FIG. 1). As illustrated in FIG. 4, the example integrated motorized conveyor roller 400 comprises a power cable 403, a first end cap 405, a second end cap 407, a motor assembly 411, a load sensor 413, a drive assembly 415, a controller component 417 and a bearing assembly 419. In various embodiments, the elements/components of the integrated motorized conveyor roller 400 (e.g., the motor assembly 411, the load sensor 413 and the drive assembly 415) are in electronic communication with the controller component 417 such that they can exchange data/information with one another.

As noted above, and as depicted in FIG. 4, the example integrated motorized conveyor roller 400 comprises a housing 401 (e.g., roller tube) configured to contain one or more components/elements of the integrated motorized conveyor roller 300. In particular, as depicted, the example integrated motorized conveyor roller 400 is configured to contain at least the motor assembly 411, the load sensor 413, the drive assembly 415, the controller component 417 and the bearing assembly 419. In various examples, the housing 401 (e.g., roller tube) of the integrated motorized conveyor roller 400 comprises a hollow cylindrical body and may comprise metal, plastic, combinations thereof, and/or the like.

As further illustrated in FIG. 4, the example integrated motorized conveyor roller 400 comprises a first end cap 405 defining a first end/surface of the example integrated motorized conveyor roller 400. As depicted, the first end cap 405 comprises a first appendage 402 configured to be operatively coupled to a conveyor (e.g., disposed between a first rail and a second rail, such as within an aperture of the first rail).

As noted above, and as depicted in FIG. 4, the example integrated motorized conveyor roller 400 comprises a motor assembly 411, a drive assembly 415 and at least one bearing assembly 419 that operate to drive/rotate the housing 401 (e.g., roller tube) of the integrated motorized conveyor roller 400 with respect to a central axis 406 of the integrated motorized conveyor roller 400. In some embodiments, each of the motor assembly 411 and the drive assembly 415 are at least partially disposed within the housing 401 (e.g., roller tube) of the integrated motorized conveyor roller 400. For example, as shown, at least a surface of the motor assembly 411 and at least a surface of the drive assembly 415 are in contact with an inner surface of the housing 401 (e.g., roller tube) of the integrated motorized conveyor roller 400. The drive assembly 415 may be configured to transfer torque from the motor assembly 411 to the housing 401 (e.g., roller tube) of the integrated motorized conveyor roller. Additionally, as illustrated, the example integrated motorized conveyor roller 400 comprises a bearing assembly 419 configured to, in conjunction with the motor assembly 411 and drive assembly 415, facilitate rotation of the integrated motorized conveyor roller 400 about the central axis 406. As shown, the bearing assembly 419 is disposed adjacent and operatively coupled to the first end cap 405 of the integrated motorized conveyor roller 400. In some embodiments, the drive assembly 415 may be fixed relative to the housing 401 (e.g., roller tube), while the motor assembly 411 is fixed relative to a frame supporting the roller tube, such that the motor assembly 411 can rotate the drive assembly 415 and the roller tube.

As further depicted, the example integrated motorized conveyor roller 400 comprises a second end cap 407 defining a second end/surface of the example integrated motorized conveyor roller 300. As depicted, the second end cap 407 comprises a second appendage 404 configured to be operatively coupled to a conveyor (e.g., disposed between a first rail and a second rail, such as within an aperture of the second rail). As noted above, the integrated motorized conveyor roller 400 comprises a power cable 403 disposed adjacent the second end cap 407 that is configured to be connected to a power supply. In some embodiments, the second end cap 407 comprises a light emitting diode (LED) element 409 that is configured to provide a visual alert in response to a detected condition of the integrated motorized conveyor roller 400.

In some embodiments, as further depicted in FIG. 4, the example integrated motorized conveyor roller 400 comprises a load sensor 413. As shown, the load sensor 413 is disposed within the housing 401 (e.g., roller tube) of the integrated motorized conveyor roller 400 between the motor assembly 411 and the drive assembly 415. The load sensor 413 is configured to determine a weight of an object disposed on at least a portion of the integrated motorized conveyor roller 400, such as by converting a weight of an object into a measurable electrical signal. For example, as an object moves along a conveyor and is incident on the motor assembly 411, the load sensor 413 can generate a measurable electrical signal (e.g., voltage output) corresponding with a weight of the object. In various embodiments, the load sensor 413 may be or comprise one or more strain gauges, piezoelectric sensors and/or the like.

As noted above, and as depicted in FIG. 4, the integrated motorized conveyor roller 400 comprises a controller component 417. As depicted, the controller component 417 may be at least partially disposed within the housing 401 (e.g., roller tube) of the integrated motorized conveyor roller 400. As depicted, the controller component 417 is disposed between the bearing assembly 419 and the drive assembly 415. In various embodiments, the controller component 417 may be or comprise one or more printed circuit boards (PCBs). For example, as depicted, the controller component 417 comprises a PCB stack comprising three PCB boards configured to be in electronic communication with one another. In various embodiments, the controller component 417 comprises a controller module that is configured to control operations of the motor assembly 411, drive assembly 415, load sensor 413 and/or the like. In some embodiments, the controller component 417 comprises a wireless module that is configured to provide a communication interface (e.g., Bluetooth, Bluetooth Low Energy (BLE), low-power wide-area network such as Long Range (LoRa), and/or the like) between the integrated motorized conveyor roller 400 and one or more other motorized conveyor rollers. Additionally, in some embodiments, the controller component 417 comprises a power module that is configured to control operations of electronic elements (e.g., circuitry, sensing element and/or the like) of the integrated motorized conveyor roller 400.

While FIG. 4 depicts an example integrated motorized conveyor roller 400, it is noted that the scope of the present disclosure is not limited to the examples shown in FIG. 4. An example integrated motorized conveyor roller 400 in accordance with the present disclosure may comprise one or more additional and/or alternative elements, and/or may be different from that illustrated in FIG. 4. For example, an integrated motorized conveyor roller in accordance with the present disclosure may comprise more than one load sensor 413.

Figure 5:
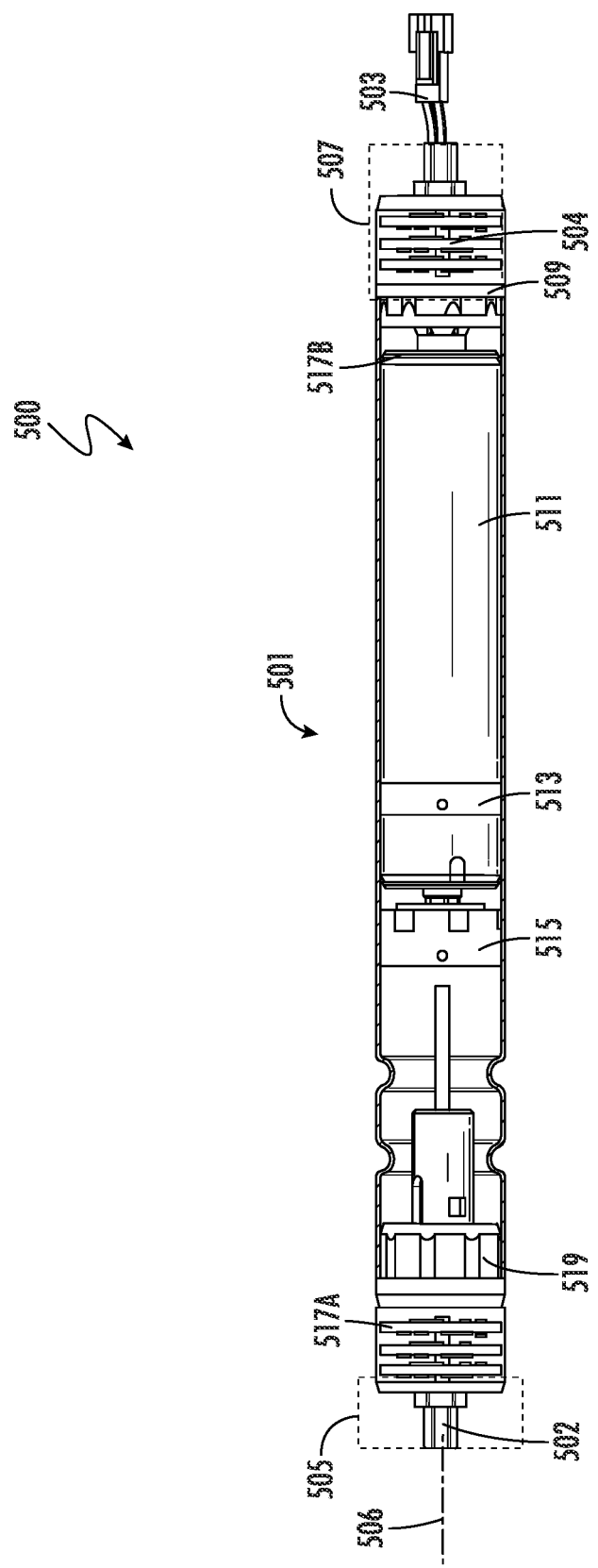
FIG. 5 illustrates a side section view of another example integrated motorized conveyor roller in accordance with various embodiments of the present disclosure.

Referring now to FIG. 5, a schematic diagram depicting a side section view of another example integrated motorized conveyor roller 500 in accordance with various embodiments of the present disclosure is provided. The example integrated motorized conveyor roller 500 may be similar or identical to the integrated motorized conveyor roller 300 discussed above in connection with FIG. 3. The example integrated motorized conveyor roller 500 may be part of a conveyor/conveyor system and may be configured to drive one or more non-motorized conveyor rollers that are operatively coupled thereto. The example integrated motorized conveyor roller 500 may be configured to convey objects along at least a portion of a conveyor based at least in part on system instructions and/or user interactions via a computing entity (such as the user computing entity 108 described above in connection with FIG. 1). As illustrated in FIG. 5, the example integrated motorized conveyor roller 500 comprises a power cable 503, a first end cap 505, a second end cap 507, a motor assembly 511, a load sensor 513, a drive assembly 515 and a bearing assembly 519. In various embodiments, the elements/components of the integrated motorized conveyor roller 500 (e.g., the motor assembly 511, the load sensor 513 and the drive assembly 515) are in electronic communication with one or more controller components (e.g., a first controller component 517A and a second controller component 517B) such that they can exchange data/information with one another.

As noted above, and as depicted in FIG. 5, the example integrated motorized conveyor roller 500 comprises a housing 501 (e.g., roller tube) configured to contain one or more components/elements of the integrated motorized conveyor roller 300. In particular, as depicted, the example integrated motorized conveyor roller 500 is configured to contain at least the motor assembly 511, the load sensor 513, the drive assembly 515 and the bearing assembly 519. In various examples, the housing 501 (e.g., roller tube) of the integrated motorized conveyor roller 500 comprises a hollow cylindrical body and may comprise metal, plastic, combinations thereof, and/or the like.

As further illustrated in FIG. 5, the example integrated motorized conveyor roller 500 comprises a first end cap 505 defining a first end/surface of the example integrated motorized conveyor roller 500. As depicted, the first end cap 505 comprises a first appendage 502 configured to be operatively coupled to a conveyor (e.g., disposed between a first rail and a second rail, such as within an aperture of the first rail). Additionally, as depicted in FIG. 5, the first end cap 505 comprises a first controller component 517A integrated therein. The first controller component 517A may be similar or identical to the controller component 417 discussed above in connection with FIG. 4.

As noted above, and as depicted in FIG. 5, the example integrated motorized conveyor roller 500 comprises a motor assembly 511, a drive assembly 515 and at least one bearing assembly 519 that operate to drive/rotate the housing 501 (e.g., roller tube) of the integrated motorized conveyor roller 500 with respect to a central axis 506 of the integrated motorized conveyor roller 500. In some embodiments, each of the motor assembly 511 and the drive assembly 515 are at least partially disposed within the housing 501 (e.g., roller tube) of the integrated motorized conveyor roller 500. For example, as shown, at least a surface of the motor assembly 511 and at least a surface of the drive assembly 515 are in contact with an inner surface of the housing 501 (e.g., roller tube) of the integrated motorized conveyor roller 500. The drive assembly 515 may be configured to transfer torque from the motor assembly 511 to the housing 501 (e.g., roller tube) of the integrated motorized conveyor roller. Additionally, as illustrated, the example integrated motorized conveyor roller 500 comprises a bearing assembly 519 configured to, in conjunction with the motor assembly 511 and drive assembly 515, facilitate rotation of the integrated motorized conveyor roller 500 about the central axis 506. As shown, the bearing assembly 519 is disposed adjacent and operatively coupled to the first end cap 505 of the integrated motorized conveyor roller 500.

As further depicted, the example integrated motorized conveyor roller 500 comprises a second end cap 507 defining a second end/surface of the example integrated motorized conveyor roller 300. As depicted, the second end cap 507 comprises a second appendage 504 configured to be operatively coupled to a conveyor (e.g., disposed between a first rail and a second rail, such as within an aperture of the second rail). Additionally, as depicted in FIG. 5, the second end cap 507 comprises a second controller component 517B integrated therein. The second controller component 517B may also be similar or identical to the controller component 417 discussed above in connection with FIG. 4. As noted above, the integrated motorized conveyor roller 500 comprises a power cable 503 disposed adjacent the second end cap 507 that is configured to be connected to a power supply. In some embodiments, the second end cap 507 comprises an LED element 509 that is configured to provide a visual alert in response to a detected condition of the integrated motorized conveyor roller 500. In various embodiments, the first controller component 517A and the second controller component 517B may provide a redundant system where either the first controller component 517A and the second controller component 517B can be utilized to continue operations of the integrated motorized conveyor roller 500 in an instance in which the other component fails. Additionally, by integrating the first controller component 517A and the second controller component 517B into the first end cap 505 and the second end cap 507 respectively, detrimental effects attributable to heat generated by the moving elements/components (e.g., the motor assembly 511 and/or drive assembly 515) on the first controller component 517A and the second controller component 517B can be significantly reduced.

In some embodiments, as further depicted in FIG. 5, the example integrated motorized conveyor roller 500 comprises a load sensor 513. As shown, the load sensor 513 is disposed within the housing 501 (e.g., roller tube) of the integrated motorized conveyor roller 500 between the motor assembly 511 and the drive assembly 515. The load sensor 513 is configured to determine a weight of an object disposed on at least a portion of the integrated motorized conveyor roller 500, such as by converting a weight of an object into a measurable electrical signal.

While FIG. 5 depicts an example integrated motorized conveyor roller 500, it is noted that the scope of the present disclosure is not limited to the examples shown in FIG. 5. An example integrated motorized conveyor roller 500 in accordance with the present disclosure may comprise one or more additional and/or alternative elements, and/or may be different from that illustrated in FIG. 5. For example, an integrated motorized conveyor roller in accordance with the present disclosure may comprise a single controller component or more than two controller components.

Figure 6:
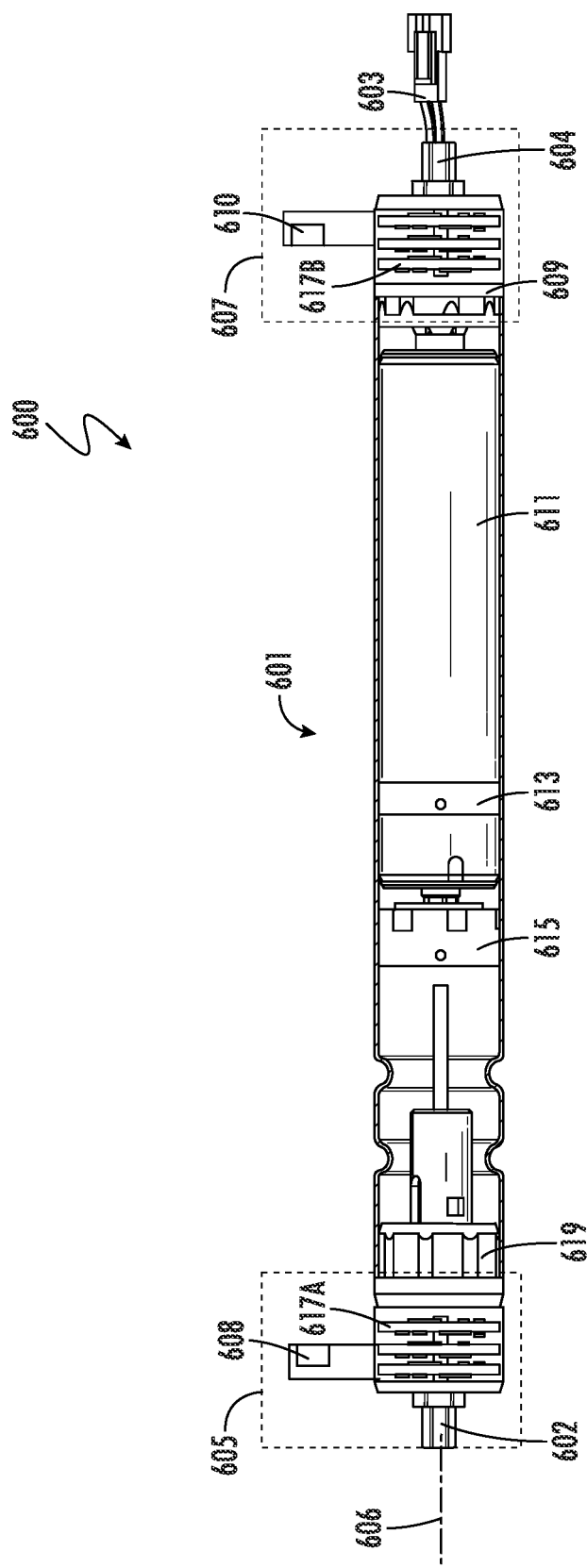
FIG. 6 illustrates a side section view of another example integrated motorized conveyor roller in accordance with various embodiments of the present disclosure.

Referring now to FIG. 6, a schematic diagram depicting a side section view of another example integrated motorized conveyor roller 600 in accordance with various embodiments of the present disclosure is provided. The example integrated motorized conveyor roller 600 may be part of a conveyor/conveyor system and may be configured to drive one or more non-motorized conveyor rollers that are operatively coupled thereto. The example integrated motorized conveyor roller 600 may be configured to convey objects along at least a portion of a conveyor based at least in part on system instructions and/or user interactions via a computing entity (such as the user computing entity 108 described above in connection with FIG. 1). As illustrated in FIG. 6, the example integrated motorized conveyor roller 600 comprises a power cable 603, a first end cap 605, a second end cap 607, a motor assembly 611, a load sensor 613, a drive assembly 615 and a bearing assembly 619. In various embodiments, the elements/components of the integrated motorized conveyor roller 600 (e.g., the motor assembly 611, the load sensor 613 and the drive assembly 615) are in electronic communication with one or more controller components (e.g., a first controller component 617A and a second controller component 617B) such that they can exchange data/information with one another.

As noted above, and as depicted in FIG. 6, the example integrated motorized conveyor roller 600 comprises a housing 601 (e.g., roller tube) configured to contain one or more components/elements of the integrated motorized conveyor roller 300. In particular, as depicted, the example integrated motorized conveyor roller 600 is configured to contain at least the motor assembly 611, the load sensor 613, the drive assembly 615 and the bearing assembly 619. In various examples, the housing 601 (e.g., roller tube) of the integrated motorized conveyor roller 600 comprises a hollow cylindrical body and may comprise metal, plastic, combinations thereof, and/or the like.

As further illustrated in FIG. 6, the example integrated motorized conveyor roller 600 comprises a first end cap 605 defining a first end/surface of the example integrated motorized conveyor roller 600. As depicted, the first end cap 605 comprises a first appendage 602 configured to be operatively coupled to a conveyor (e.g., disposed between a first rail and a second rail, such as within an aperture of the first rail). Additionally, as depicted in FIG. 6, the first end cap 605 comprises a first controller component 617A integrated therein. The first controller component 617A may be similar or identical to the controller component 417 discussed above in connection with FIG. 4. As further depicted in FIG. 6, the first end cap 605 comprises a first sensing element 608 disposed on a top surface of the first end cap 605. In various embodiments, the first sensing element 608 may be or comprise one or more photo eyes, light detection and ranging (LiDAR) sensors, radio detection and ranging (RADAR) sensors, infrared (IR) cameras, 3D cameras, 360° Cameras, photoelectric sensors (e.g., photo eyes) or proximity sensors. The first sensing element 608 may be in electronic communication with the first controller component 617A and/or the second controller component 617B such that it can exchange data/information therewith. The first sensing element 608 may be configured to obtain sensor data (e.g., image data) relating to the integrated motorized conveyor roller 600, a conveyor associated therewith, objects disposed on the conveyor, and/or the like. For example, utilizing the first sensing element 608, the integrated motorized conveyor roller can determine a presence/absence, weight, location and/or condition of an object on a conveyor. In some embodiments, the integrated motorized conveyor roller 600 may be configured to store and/or transfer at least a portion of the sensor data obtained by the first sensing element 608 with another computing entity such as a user computing entity or another motorized conveyor roller. The sensor data may be associated with and/or stored in conjunction with a timestamp. Accordingly, sensor data obtained from more than one motorized conveyor roller may be correlated (e.g., based at least in part on timestamp data associated therewith) in order to determine a location of a plurality of objects disposed on a particular portion of a conveyor. Additionally and/or alternatively, in some embodiments, the integrated motorized conveyor roller may include an integrated barcode scanner (e.g., Radio frequency identification (RFID) scanner to facilitate sortation operations).

As noted above, and as depicted in FIG. 6, the example integrated motorized conveyor roller 600 comprises a motor assembly 611, a drive assembly 615 and at least one bearing assembly 619 that operate to drive/rotate the housing 601 (e.g., roller tube) of the integrated motorized conveyor roller 600 with respect to a central axis 606 of the integrated motorized conveyor roller 600. In some embodiments, each of the motor assembly 611 and the drive assembly 615 are at least partially disposed within the housing 601 (e.g., roller tube) of the integrated motorized conveyor roller 600. For example, as shown, at least a surface of the motor assembly 611 and at least a surface of the drive assembly 615 are in contact with an inner surface of the housing 601 (e.g., roller tube) of the integrated motorized conveyor roller 600. The drive assembly 615 may be configured to transfer torque from the motor assembly 611 to the housing 601 (e.g., roller tube) of the integrated motorized conveyor roller. Additionally, as illustrated, the example integrated motorized conveyor roller 600 comprises a bearing assembly 619 configured to, in conjunction with the motor assembly 611 and drive assembly 615, facilitate rotation of the integrated motorized conveyor roller 600 about the central axis 606. As shown, the bearing assembly 619 is disposed adjacent and operatively coupled to the first end cap 605 of the integrated motorized conveyor roller 600.

As further depicted, the example integrated motorized conveyor roller 600 comprises a second end cap 607 defining a second end/surface of the example integrated motorized conveyor roller 300. As depicted, the second end cap 607 comprises a second appendage 604 configured to be operatively coupled to a conveyor (e.g., disposed between a first rail and a second rail, such as within an aperture of the second rail). Additionally, as depicted in FIG. 6, the second end cap 607 comprises a second controller component 617B integrated therein. The second controller component 617B may also be similar or identical to the controller component 417 discussed above in connection with FIG. 4. As further depicted in FIG. 6, the second end cap 607 comprises a second sensing element 610 disposed on a top surface of the second end cap 607. The second sensing element 610 may be similar or identical to the first sensing element 608. In some embodiments, the second sensing element 610 may be different from the first sensing element 608. In various embodiments, the second sensing element 610 may be or comprise one or more photo eyes, light detection and ranging (LiDAR) sensors, radio detection and ranging (RADAR) sensors, infrared (IR) cameras, 3D cameras, 360° Cameras, photoelectric sensors or proximity sensors. The second sensing element 610 may be in electronic communication with the first controller component 617A and/or the second controller component 617B such that it can exchange data/information therewith. The second sensing element 610 may be configured to obtain sensor data (e.g., image data) relating to the integrated motorized conveyor roller 600, a conveyor associated therewith, objects disposed on the conveyor, and/or the like. For example, utilizing the second sensing element 610, the integrated motorized conveyor roller 600 can determine a weight, location and/or condition of an object on a conveyor. In some embodiments, the integrated motorized conveyor roller 600 may be configured to store and/or transfer at least a portion of the sensor data obtained by the second sensing element 610 with another computing entity such as a user computing entity or another motorized conveyor roller. The sensor data may be associated with and/or stored in conjunction with a timestamp. Accordingly, sensor data obtained from more than one motorized conveyor roller may be correlated (e.g., based at least in part on timestamp data associated therewith) in order to determine a weight of a plurality of objects disposed on a particular portion of a conveyor.

As noted above, the integrated motorized conveyor roller 600 comprises a power cable 603 disposed adjacent the second end cap 607 that is configured to be connected to a power supply. In some embodiments, the second end cap 607 comprises an LED element 609 that is configured to provide a visual alert in response to a detected condition of the integrated motorized conveyor roller 600.

In some embodiments, as further depicted in FIG. 6, the example integrated motorized conveyor roller 600 comprises a load sensor 613. As shown, the load sensor 613 is disposed within the housing 601 (e.g., roller tube) of the integrated motorized conveyor roller 600 between the motor assembly 611 and the drive assembly 615. The load sensor 613 is configured to determine a weight of an object disposed on at least a portion of the integrated motorized conveyor roller 600, such as by converting a weight of an object into a measurable electrical signal.

While FIG. 6 depicts an example integrated motorized conveyor roller 600, it is noted that the scope of the present disclosure is not limited to the examples shown in FIG. 6. An example integrated motorized conveyor roller 600 in accordance with the present disclosure may comprise one or more additional and/or alternative elements, and/or may be different from that illustrated in FIG. 6. For example, an integrated motorized conveyor roller in accordance with the present disclosure may comprise a single sensing element or more than two sensing elements.

Figure 7:
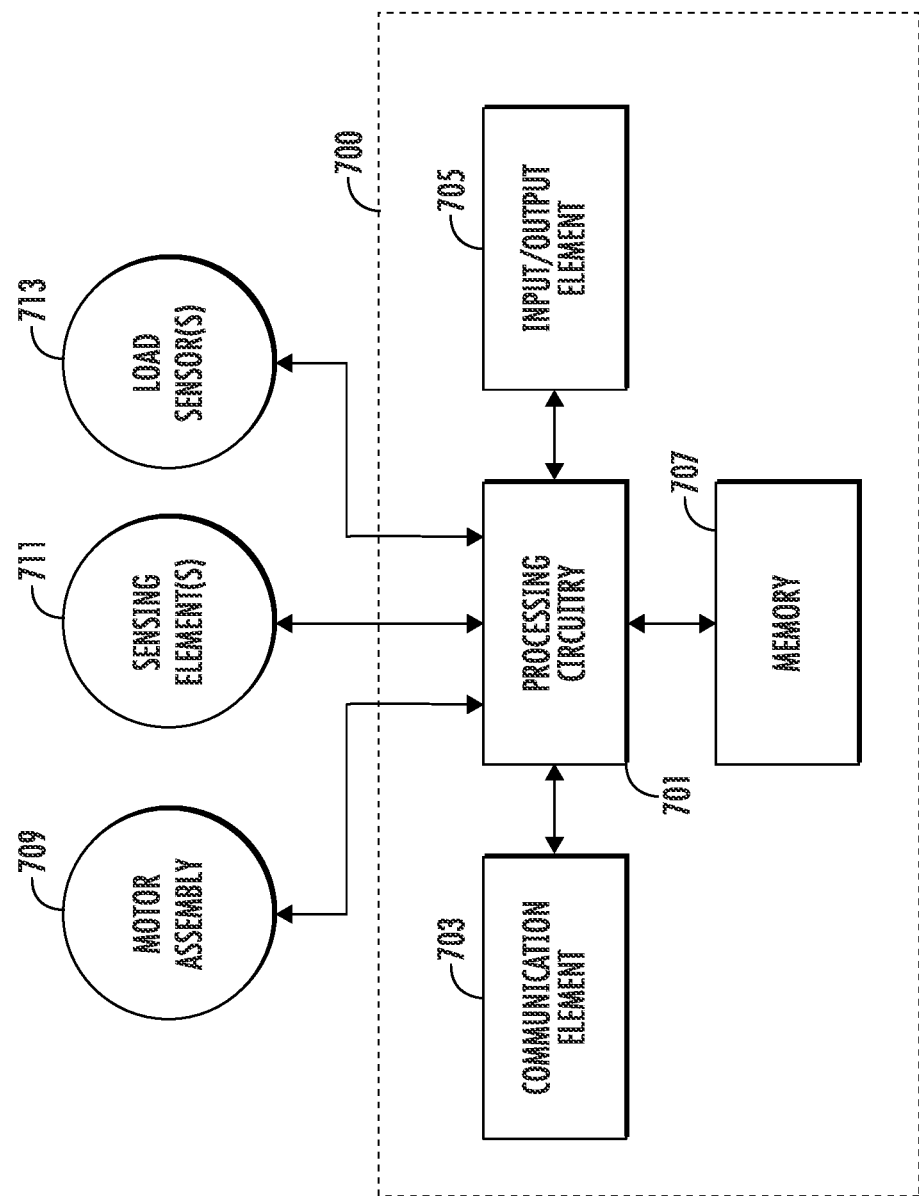
FIG. 7 illustrates an example controller component in electronic communication with various other components of an example integrated motorized conveyor roller in accordance with various embodiments of the present disclosure.

Referring now to FIG. 7, a schematic diagram depicting an example controller component 700 in electronic communication with a motor assembly 709, sensing element(s) 711 and load sensor(s) 713 of an motorized conveyor roller in accordance with various embodiments of the present disclosure is provided. As shown, the controller component 700 comprises processing circuitry 701, a communication element 703, input/output element 705, a memory 707 and/or other components configured to perform various operations, procedures, functions or the like described herein.

In some embodiments, the controller component 700 may be or comprise a PCB. In some examples, the controller component 700 (e.g., PCB) may further comprise one or more of a full bridge motor driver, a hall sensor, one or more thermal sensors, one or more user interfaces, one or more protection circuits, configuration management circuitry 809, a wireless interface, sensing element circuitry (e.g., image sensor circuitry), an interface connector, power control circuitry, gate driver circuitry and/or the like.

The processing circuitry 701 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 7 as a single processor, in an embodiment, the processing circuitry 701 may include a plurality of processors and signal processing modules. The plurality of processors may be embodied on a single electronic device or may be distributed across a plurality of electronic devices collectively configured to function as the circuitry of the integrated motorized conveyor roller. The plurality of processors may be in operative communication with each other and may be collectively configured to perform one or more functionalities of the circuitry of the integrated motorized conveyor roller as described herein. In an example embodiment, the processing circuitry 701 may be configured to execute instructions stored in the memory 707 or otherwise accessible to the processing circuitry 701. These instructions, when executed by the processing circuitry 701, may cause the circuitry of the integrated motorized conveyor roller to perform one or more of the functionalities, as described herein.

Whether configured by hardware, firmware/software methods, or by a combination thereof, the processing circuitry 701 may include an entity capable of performing operations according to embodiments of the present disclosure while configured accordingly. Thus, for example, when the processing circuitry 701 is embodied as an ASIC, FPGA or the like, the processing circuitry 701 may include specifically configured hardware for conducting one or more operations described herein. Additionally, or alternatively, when the processing circuitry 701 is embodied as an executor of instructions, such as may be stored in the memory 707, the instructions may specifically configure the processing circuitry 701 to perform one or more algorithms and operations described herein.

Thus, the processing circuitry 701 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory can also be located internal to another computing resource (e.g., enabling computer readable instructions to be downloaded over the Internet or another wired or wireless connection).

The memory 707 may include suitable logic, circuitry, and/or interfaces that are adapted to store a set of instructions that is executable by the processing circuitry 701 to perform predetermined operations. Additionally or alternately, the memory 707 may be configured to store data/information, application programs, instructions, and etc., so that the controller component 700 can execute various functions according to the embodiments of the present disclosure. For example, in at least some embodiments, the memory 707 is configured to cache input data for processing by the processing circuitry 701. Thus, in at least some embodiments, the memory 707 is configured to store program instructions for execution by the processing circuitry 701. The memory 707 may store information in the form of static and/or dynamic information. When the functions are executed, the stored information may be stored and/or used by the controller component 700. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 707 may be integrated with the processing circuitry 701 on a single chip, without departing from the scope of the disclosure.

The communication element 703 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 707) and executed by a processing component 700 (for example, the processing circuitry 701). In some embodiments, the communication element 703 (as with other components discussed herein) may be at least partially implemented as the processing circuitry 701 or otherwise controlled by the processing circuitry 701. In this regard, the communication element 703 may communicate with the processing circuitry 701, for example, through a bus. The communication element 703 may comprise, for example, antennas, transmitters, receivers, transceivers, network interface cards and/or supporting hardware and/or firmware/software, and is used for establishing communication with another apparatus. The communication element 703 may be configured to receive and/or transmit any data that may be stored by the memory 707 by using any protocol that can be used for communication between apparatuses. The communication element 703 may additionally or alternatively communicate with the memory 707, the input/output element 705 and/or any other component of the processing component 700, for example, through a bus.

In some embodiments, the processing component 700 may comprise an input/output element 705. The input/output element 705 may communicate with the processing circuitry 701 to receive instructions input by the user and/or to provide audible, visual, mechanical or other outputs to the user. Therefore, the input/output element 705 may comprise supporting devices, such as a keyboard, a mouse, a display, a touch screen display, and/or other input/output mechanisms. Alternatively, at least some aspects of the input/output element 705 may be implemented on a device used by the user to communicate with the processing component 700. The input/output element 705 may communicate with the memory 707, the communication element 703 and/or any other component, for example, through a bus. One or a plurality of input/output modules and/or other components may be included in the processing component 700.

Figure 8:
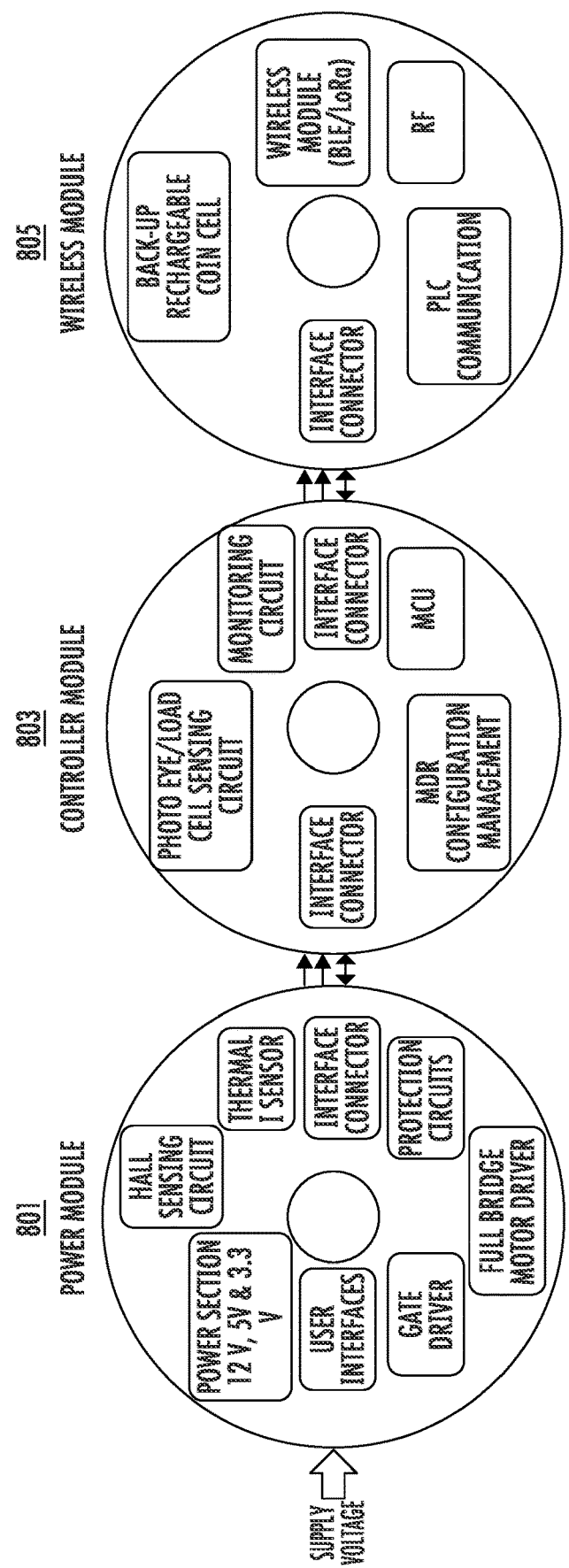
FIG. 8 illustrates an example controller component in accordance with various embodiments of the present disclosure.

Referring now to FIG. 8, a schematic diagram depicting an example controller component 800 of an integrated motorized conveyor roller in accordance with various embodiments of the present disclosure is provided. In some examples, the controller component 800 may be similar or identical to the controller component 417 described above in connection with FIG. 4.

In some embodiments, as depicted, the controller component 800 may be or comprise a PCB stack comprising a plurality of PCB boards in electronic communication with one another via interface connectors. In particular, as depicted, the controller component 800 comprises a power module 801, a controller module 803 and a wireless module 805.

As depicted in FIG. 8, the power module 801 comprises a first PCB board configured to control operations of electronic elements of the integrated motorized conveyor roller. In the depicted embodiment, the power module 801 is configured to receive/condition a power supply and comprises at least a Hall sensing circuit, a thermal sensor, interface connector(s), one or more protection circuits, a full bridge motor driver, a gate driver, one or more user interfaces and a power section.

As noted above, the controller component 800 comprises a controller module 803. The controller module 803 comprises a second PCB board that is configured to control various operations of the integrated motorized conveyor roller. In the depicted embodiment, the controller module 803 comprises at least one sensing element (e.g., photo eye) circuit, interface connector(s), a micro controller unit (MCU) and an motorized conveyor roller configuration management circuit.

As noted above, the controller component 800 comprises a wireless module 805. The wireless module 805 comprises a third PCB board that is configured to provide a communication interface (e.g., Bluetooth, BLE, LoRa, and/or the like). For example, between the integrated motorized conveyor roller and one or more other motorized conveyor rollers.

As further depicted in FIG. 8, the wireless module 805 comprises a power supply (e.g., back-up rechargeable coin cell) a BLE and/or LoRa interface, a communication element, a monitoring circuit and interface connector(s).

In some embodiments, as depicted in FIG. 8, the controller component 800/motorized conveyor roller may comprise a monitoring circuit for monitoring operations and/or operational conditions of the integrated motorized conveyor roller (e.g., providing self-check functionality) via one or more sensing elements. By way of example, a monitoring circuit of the controller component 800 may be operatively coupled to a magnetic sensing element (e.g., an inductor or transformer). During operations, the rotation of the integrated motorized conveyor roller motor assembly generates a magnetic field which in turn generates a measurable electrical signal (e.g., voltage output) across the magnetic sensing element coupled thereto. An output of a comparator circuit may be used to provide an output describing one or more parameters associated with motorized conveyor roller (e.g., a lifetime motor operational time, number of rotations, loading conditions, vibrational information, installation issues, belt wear out, and/or the like). In some embodiments, at least a portion of the output of the comparator circuit may be measured and stored in memory. In some examples, the controller component 800 may provide a control indication to actuate an LED element in response to detecting certain conditions (e.g., complete loss of motor function or overload scenario). In various embodiments, the controller component 800 may be operatively coupled to other types of sensing elements including pressure sensors, vibrational sensors, temperature sensors, position sensors, and/or the like.

In various embodiments, the controller component 800 may store (e.g., periodically and/or in response to requests) information/data describing various operational parameters of the integrated motorized conveyor roller including lifetime motor operational time, object information (e.g., information describing presence/absence of an object and/or other characteristics, image data or the like).

While FIG. 8 depicts an example controller component 800 (e.g., PCB stack), it is noted that the scope of the present disclosure is not limited to the example shown in FIG. 8. An example controller component 800 in accordance with the present disclosure may comprise one or more additional and/or alternative elements, and/or may be different from that illustrated in FIG. 8. For example, an integrated motorized conveyor roller in accordance with the present disclosure may comprise a single PCB board or more than three PCB boards.

Figure 9:
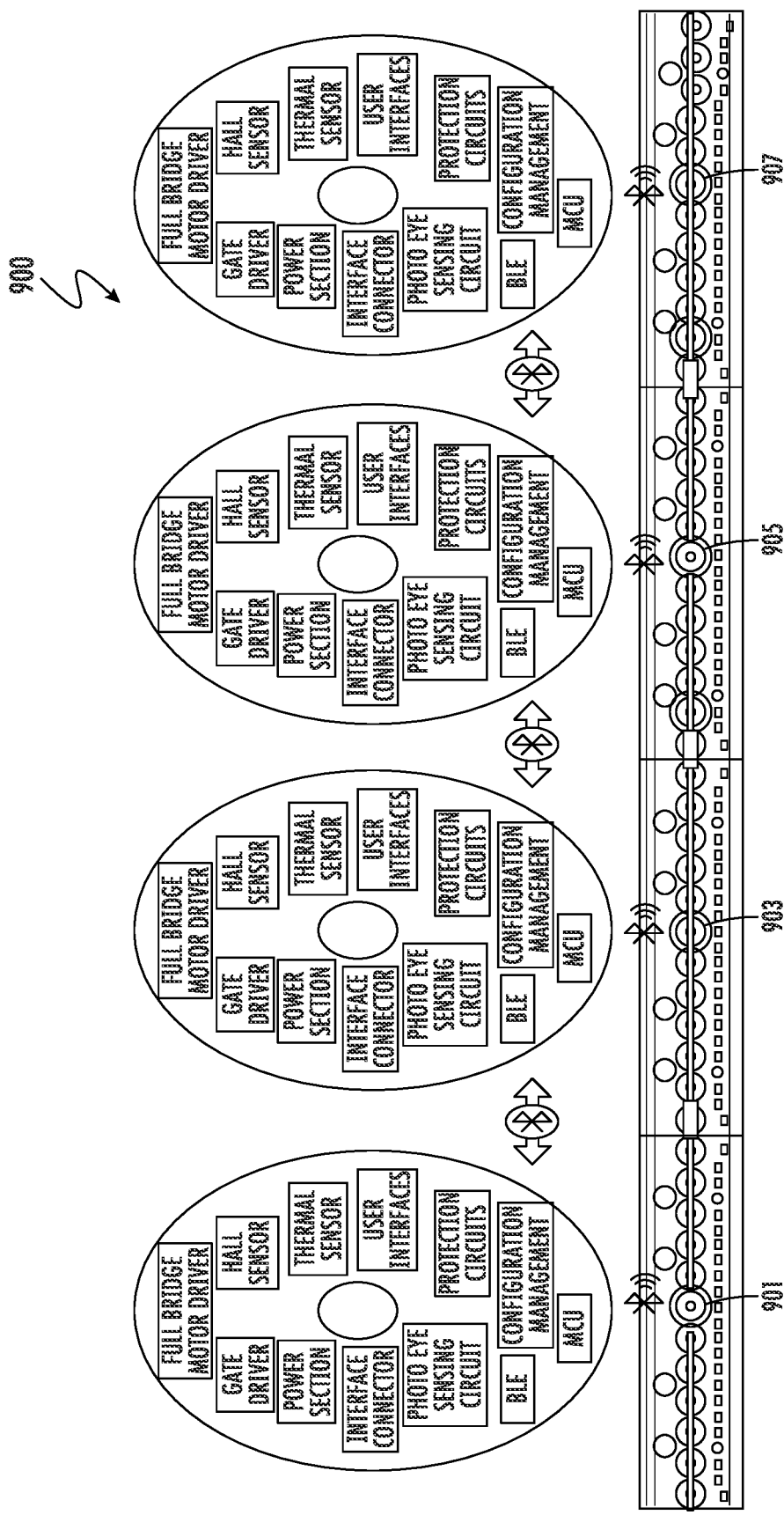
FIG. 9 illustrates an operational example of a system in accordance with various embodiments of the present disclosure.

Referring now to FIG. 9, a schematic diagram depicting an example system 900 in accordance with various embodiments of the present disclosure is provided. As depicted, the example system 900 comprises a plurality of integrated motorized conveyor rollers in communication with one another. In particular, the system 900 comprises a first integrated motorized conveyor roller 901, a second integrated motorized conveyor roller 903, a third integrated motorized conveyor roller 905 and a fourth integrated motorized conveyor roller 907. In some embodiments, each of the first integrated motorized conveyor roller 901, the second integrated motorized conveyor roller 903, the third integrated motorized conveyor roller 905 and the fourth integrated motorized conveyor roller 907 may be associated with a particular zone, segment and/or the like of an example conveyor.

In various embodiments, each of the first integrated motorized conveyor roller 901, the second integrated motorized conveyor roller 903, the third integrated motorized conveyor roller 905 and the fourth integrated motorized conveyor roller 907 may be associated with a unique addressable identifier (e.g., machine readable code or string). Each unique addressable identifier may further be associated with (e.g., tagged with) a particular physical location of a conveyor system. As discussed herein, each of the first integrated motorized conveyor roller 901, the second integrated motorized conveyor roller 903, the third integrated motorized conveyor roller 905 and the fourth integrated motorized conveyor roller 907 may comprise a wireless module/component to enable wireless communication with one another and/or other computing entities. In some embodiments, each of the first integrated motorized conveyor roller 901, the second integrated motorized conveyor roller 903, the third integrated motorized conveyor roller 905 and the fourth integrated motorized conveyor roller 907 may be configured to be associated with a particular zone and/or operate as a master or slave with respect to the other integrated motorized conveyor rollers in the zone. In some embodiments, a plurality of integrated integrated motorized conveyor rollers (e.g., the first integrated motorized conveyor roller 901, the second integrated motorized conveyor roller 903, the third integrated motorized conveyor roller 905 and the fourth integrated motorized conveyor roller 907) may be configured in MESH network (e.g., as nodes within a local network) and may be configured to communicate with other integrated motorized conveyor rollers associated with other conveyors and/or zones.

Figure 10:
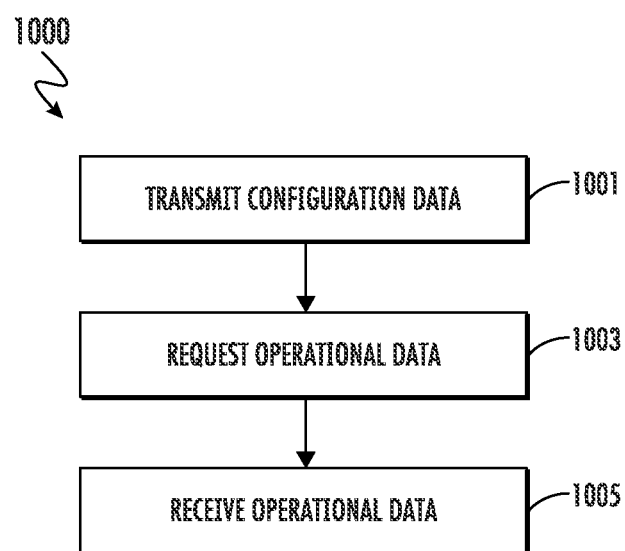
FIG. 10 is a flowchart diagram illustrating example operations in accordance with various embodiments of the present disclosure.

Referring now to FIG. 10, a flowchart diagram illustrating example operations 1000 in accordance with various embodiments of the present disclosure is provided. In some examples, the method 1000 may be performed by various system components (for example, but not limited to, processing circuitry of a computing entity 106 described above with regard to FIG. 1). The computing entity 106 may be or comprise a central server. In some examples, the processing circuitry may be electrically coupled to and/or in electronic communication with other circuitries, such as, but not limited to, one or more integrated motorized conveyor rollers (such as, for example, integrated motorized conveyor rollers 901, 903, 905 and 907 described above in connection with FIG. 9).

The example method 1000 begins at step/operation 1001. At step/operation 1001, processing circuitry (such as, but not limited to, the processing circuitry of the computing entity 106 described above in connection with FIG. 1) transmits configuration data to one or more integrated motorized conveyor rollers (e.g., a plurality of integrated motorized conveyor rollers associated with a particular zone and/or conveyor). In some examples, transmitting configuration data may comprise establishing a connection with one or more motorized conveyor roller such that the integrated motorized conveyor roller and the processing circuitry (e.g., computing entity) can exchange data/information with one another. In some examples, the configuration data may comprise target parameters and/or operational data such as an operating mode (e.g., singulation, slug or zero pressure accumulation (ZPA)), a direction or motion, an acceleration time and/or deceleration time.

Subsequent to step/operation 1001, the method 1000 proceeds to step/operation 1003. At step/operation 1003, the processing circuitry transmits a request (e.g., to one or more motorized conveyor rollers) for operational data. In some embodiments, the processing circuitry may transmit the request to a master integrated motorized conveyor roller associated with a particular zone/plurality of motorized conveyor rollers. In some examples, transmitting the request for operational data may comprise establishing a connection with one or more integrated motorized conveyor rollers such that the one or more integrated motorized conveyor rollers and the processing circuitry (e.g., computing entity) can exchange data/information with one another.

Subsequent to step/operation 1003, the method 1000 proceeds to step/operation 1005. At step/operation 1005, the processing circuitry receives an indication (e.g., from one or more example integrated motorized conveyor roller) comprising the requested operational data. The operational data may comprise sensor data obtained via one or more sensing elements of the one or more motorized conveyor rollers (e.g., image sensors, magnetic sensors, pressure sensors, load sensors, vibrational sensors, and/or the like). In some embodiments, the processing circuitry may transmit a request for operational data or the operational data may be provided in response to certain predetermined triggers or operational conditions being detected (e.g., an overload condition or motor failure). In some embodiments, the operational data may be associated with a particular integrated motorized conveyor roller and/or zone such that an operator can easily identify and address issues in the field in real-time. In some embodiments, operational data may be provided on a zonal basis so that pairings with other integrated motorized conveyor rollers and critical parameters that are out of range with other motorized conveyor rollers in a particular zone can be identified.

Figure 11:
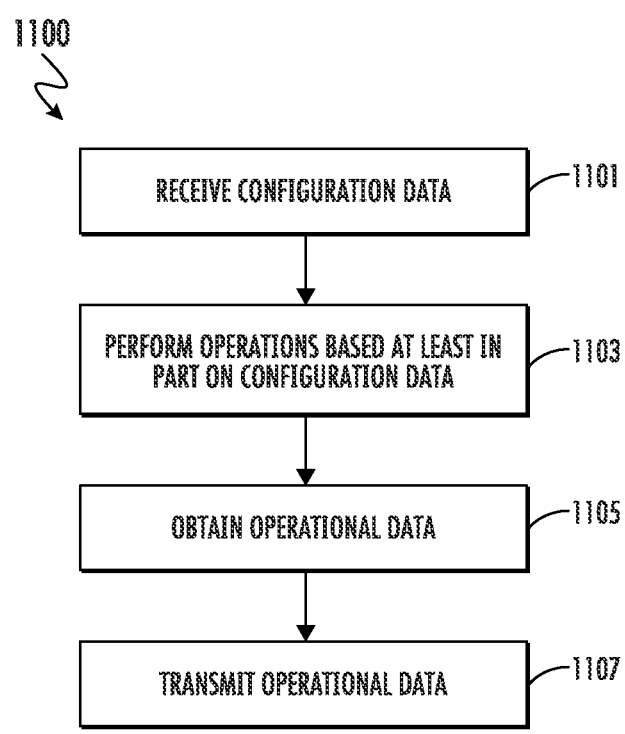
FIG. 11 is a flowchart diagram illustrating example operations in accordance with various embodiments of the present disclosure.

Referring now to FIG. 11, a flowchart diagram illustrating example operations 1100 in accordance with various embodiments of the present disclosure is provided. In some examples, the method 1100 may be performed by various system components (for example, but not limited to, controller component 800 of the integrated motorized conveyor roller described above with regard to FIG. 8). In some examples, the processing circuitry may be electrically coupled to and/or in electronic communication with other circuitries, such as, but not limited to, one or more computing entities (such as, but not limited to, computing entity 106 described above in connection with FIG. 1) a memory (such as, for example, random access memory (RAM) for storing computer program instructions), and/or the like.

The example method 1100 begins at step/operation 1101. At step/operation 1101, controller component (such as, but not limited to, the controller component 800 of the integrated motorized conveyor roller illustrated with regard to FIG. 8, discussed above) receives configuration data (e.g., from the processing circuitry of the computing entity 106 described above in connection with FIG. 1). As noted above, the configuration data may comprise target parameters such as an operating mode (e.g., singulation, slug or ZPA), a direction of motion, an acceleration time and/or deceleration time.

Subsequent to step/operation 1101, the method 1100 proceeds to step/operation 1103. At step/operation 1103, controller component performs operations based at least in part on the received configuration data.

Subsequent to step/operation 1103, the example method 1100 proceeds to step/operation 1105. At step/operation 1105, controller component obtains sensor data (e.g., via at least one sensing element, such as, but not limited to, sensing element(s) 711 described above in connection with FIG. 7). The at least one sensing element may include image sensors, magnetic sensors and/or the like. By way of example, controller component obtains sensor data (e.g., image data, load sensor data) describing location(s) and/or characteristics of one or more objects on at least a portion of the conveyor associated therewith. For example, the processing component may be configured to process the sensor data, such as by computer-executable instructions, that indicate which data is to be used in the analysis, provide one or more algorithms or functions for performing the analysis, provide one or more coefficients and/or parameters to be used in accordance with an algorithm for performing the analysis, perform one or more guidelines for providing a response indicating a result in the analysis, and/or the like. In example embodiments, the computer executable instructions may be configured in accordance with a standardized computer programming language. In an example embodiment, the computer-executable instructions may comprise a reference to a function repository and/or one or more coefficients and/or parameters to be used in the calculation and or determination of the result of the referenced instructions, function or algorithm. In some embodiments, at least a portion of the analysis may be performed by another computing entity (such as, for example, without limitation, the one or more computing entities 106 described above with regard to FIG. 1). In such examples, the computing entity may perform at least a portion of the analysis and provide (e.g., transmit or send) the results of the analysis to the processing component of the integrated motorized conveyor roller. Additionally and/or alternatively, controller component obtains sensor data relating to operations of the integrated motorized conveyor roller (e.g., a lifetime motor operational time, number of rotations, loading conditions, vibrational information, installation issues, belt wear out, and/or the like).

Subsequent to step/operation 1103, the example method 1100 proceeds to step/operation 1105. At step/operation 1105, controller component transmits an indication comprising operational data. In various examples, the indication requesting additional operational data may be transmitted to a computing entity (e.g., central server) in electronic communication with the integrated motorized conveyor roller.

Using the methods and techniques described above, integrated motorized conveyor rollers may perform self-check, prognostic and/or diagnostic operations and provide associated data/information to another computing entity (e.g., central server). Additionally, a computing entity (e.g., central server) can remotely configure and/or provide configuration data to one or more integrated motorized conveyor rollers in real-time thus eliminating the need for time consuming, manual configuration operations in the field (e.g., performed by human agents via a wired connection to a motorized conveyor roller).

In some examples, one or more of the procedures described in FIG. 10 and FIG. 11 may be embodied by computer program instructions, which may be stored by a memory (such as a non-transitory memory) of a system employing an embodiment of the present disclosure and executed by a processing component/circuitry of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information. In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A conveyor system comprising:
   at least one integrated motorized conveyor roller, the integrated motorized conveyor roller comprising:
   a housing;
   a motor assembly and a drive assembly at least partially disposed within the housing that are configured to cause rotation of at least a portion of the integrated motorized conveyor roller;
   at least one sensing element disposed within the housing, wherein the at least one sensing element is positioned between the motor assembly and the drive assembly; and
   at least one controller component in electronic communication with the at least one sensing element, the motor assembly and the drive assembly, wherein the controller component is configured to obtain operational data via the at least one sensing element.

2. The conveyor system of claim 1, wherein the controller component is further configured to:
   receive configuration data from a computing entity in electronic communication with the controller component, and perform operations based at least in part on the configuration data.

3. The conveyor system of claim 1, wherein the controller component is further configured to transmit at least a portion of the operational data to a computing entity in electronic communication with the controller component.

4. The conveyor system of claim 1, wherein the at least one sensing element comprises a load sensor that is configured to detect a presence or weight of an object disposed adjacent the integrated motorized conveyor roller.

5. The conveyor system of claim 4, wherein the controller component is further configured to provide information regarding the presence or location of the object to at least one of another integrated motorized conveyer roller controller component or another computing entity in electronic communication therewith.

6. The conveyor system of claim 1, wherein the integrated motorized conveyor roller further comprising at least one or more light detection and ranging (LiDAR) sensors, radio detection and ranging (RADAR) sensors, infrared (IR) cameras, 3D cameras, 360° cameras or photoelectric sensors.

7. The conveyor system of claim 1, wherein the at least one sensing element is configured to detect one or more parameters associated with the motor assembly.

8. The conveyor system of claim 7, wherein the one or more parameters comprise at least one of a lifetime motor operational time, a number of rotations, loading conditions or vibrational information.

9. The conveyor system of claim 1, wherein the controller component comprises at least one printed circuit board (PCB) stack.

10. The conveyor system of claim 9, wherein the at least one PCB stack is integrated into an end cap of the integrated motorized conveyor roller.

11. The conveyor system of claim 1, wherein the controller component is in electronic communication with one or more other motorized conveyor roller controller components such that they can exchange data with one another.

12. The conveyor system of claim 11, wherein the controller component is in electronic communication with the one or more other motorized conveyor roller controller components or computing entities via a Bluetooth, Bluetooth Low Energy (BLE) or Long Range (LoRa) connection.

13. A computer program product comprising at least one non-transitory computer-readable storage medium having computer-readable program instructions stored therein, the computer-readable program instructions configured to:
   receive configuration data from a computing entity in electronic communication with the controller component;
   cause rotation of at least a portion of the integrated motorized conveyor roller via a motor assembly and a drive assembly at least partially disposed within a housing of the integrated motorized conveyor roller, based at least in part on the configuration data; and
   obtain operational data via at least one sensing element disposed within the integrated motorized conveyor roller, wherein the at least one sensing element is positioned between the motor assembly and the drive assembly.

14. The computer program product of claim 13, further configured to:

obtain operational data via at least one sensing element of the integrated motorized conveyor roller.

15. The computer program product of claim 14, further configured to:
transmit at least a portion of the operational data to a computing entity in electronic communication with the controller component.

16. The computer program product of claim 13, wherein the at least one sensing element comprises a load sensor that is configured to detect a presence or weight of an object disposed adjacent the integrated motorized conveyor roller.

17. The computer program product of claim 16, further configured to:
provide information regarding the presence or location of the object to at least one of another integrated motorized conveyer roller controller component or another computing entity in electronic communication therewith.

18. The computer program product of claim 13, further configured to: communicate with one or more other motorized conveyor roller controller components such that they can exchange data with one another.

19. The computer program product of claim 13, wherein the at least one sensing element is configured to detect one or more parameters associated with the motor assembly.

20. The computer program product of claim 19, wherein the one or more parameters comprise at least one of a lifetime motor operational time, a number of rotations, loading conditions or vibrational information.

* * * * *